(12) United States Patent
Lucani et al.

(10) Patent No.: US 8,473,998 B1
(45) Date of Patent: Jun. 25, 2013

(54) NETWORK CODING FOR MULTI-RESOLUTION MULTICAST

(75) Inventors: Daniel E. Lucani, Cambridge, MA (US); Minji Kim, Cambridge, MA (US); Fang Zhao, Cambridge, MA (US); Xiaomeng Shi, Roxbury, MA (US); Muriel Medard, Belmont, MA (US); Marie-Jose Montpetit, Boston, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 288 days.

(21) Appl. No.: 12/846,292

(22) Filed: Jul. 29, 2010

Related U.S. Application Data

(60) Provisional application No. 61/229,570, filed on Jul. 29, 2009.

(51) Int. Cl.
| | |
|---|---|
| *H04N 7/12* | (2006.01) |
| *H04N 7/16* | (2011.01) |
| *H04N 7/173* | (2011.01) |
| *H04N 11/02* | (2006.01) |
| *H04N 11/04* | (2006.01) |

(52) U.S. Cl.
USPC ............ 725/118; 725/62; 725/86; 725/95; 725/96; 375/240.01

(58) Field of Classification Search
USPC .......... 725/62, 86, 95, 96, 118, 119; 709/219, 709/231
See application file for complete search history.

(56) References Cited

U.S. PATENT DOCUMENTS

| | | | |
|---|---|---|---|
| 6,798,838 B1* | 9/2004 | Ngo ........................... 725/95 |
| 2001/0017941 A1* | 8/2001 | Chaddha .................... 382/236 |
| 2002/0091810 A1* | 7/2002 | Hundscheidt et al. ...... 709/231 |
| 2003/0061368 A1* | 3/2003 | Chaddha .................... 709/231 |
| 2003/0172131 A1* | 9/2003 | Ao ............................. 709/231 |
| 2004/0045030 A1* | 3/2004 | Reynolds et al. ........... 725/110 |
| 2004/0261113 A1* | 12/2004 | Paul et al. .................. 725/135 |
| 2005/0275752 A1* | 12/2005 | Li et al. ...................... 725/135 |
| 2006/0200848 A1* | 9/2006 | Baldine-Brunel et al. ..... 725/90 |
| 2009/0141874 A1* | 6/2009 | Cazoulat et al. ............. 725/62 |
| 2010/0165908 A1* | 7/2010 | Mun et al. .................. 370/312 |
| 2010/0228862 A1* | 9/2010 | Myers ........................ 709/231 |
| 2010/0275229 A1* | 10/2010 | Civanlar et al. ............. 725/118 |

* cited by examiner

*Primary Examiner* — Pankaj Kumar
*Assistant Examiner* — Randy Flynn
(74) *Attorney, Agent, or Firm* — David W. Rouille

(57) ABSTRACT

A method, apparatus and computer program product for utilizing network coding for multi-resolution multicast is presented. A network source partitions source content into a base layer and one or more refinement layers. The network source receives a respective one or more push-back messages from one or more network destination receivers, the push-back messages identifying the one or more refinement layers suited for each one of the one or more network destination receivers. The network source computes a network code involving the base layer and the one or more refinement layers for at least one of the one or more network destination receivers, and transmits the network code to the one or more network destination receivers in accordance with the push-back messages.

18 Claims, 17 Drawing Sheets

NETWORK CODING FOR MULTI-RESOLUTION MULTICAST

CROSS REFERENCE TO RELATED APPLICATIONS

The present application claims the benefit of U.S. Provisional Patent Application No. 61/229,570, filed on Jul. 29, 2009, which is incorporated herein by reference in its entirety.

GOVERNMENT RIGHTS

This invention was made with government support under Contract No N66001-06-C-2020 awarded by the Defense Advanced Research Projects Agency and under Contract No. W911NF-05-1-2046 awarded by the Army Research Office. The government has certain rights in his invention.

BACKGROUND

While video and television are well known to represent a significant proportion of traffic in the next few years, there exists a disconnect between what the network planners envisage and what the users expect. The demand for High Definition (HD) video is increasing faster than the bandwidth deployment. In addition, convergence of telecommunications and entertainment services create new requirements from quality of service (QoS) to mobility that stress the limits of existing networks. The industry is just starting to awake to the new realities of multi-screen, multi-network and multimedia experiences. This new reality is also reflected by the massive migration of video content from the traditional broadcast media to the Internet with Internet Protocol Television (IPTV), IP video and mobile TV becoming more and more almost interchangeable. While a lot of work has been done on controlling the next generation networks, as illustrated by the development of the Internet Multimedia Subsystem (IMS), little has been done to alleviate the transmission of the data itself. People are mobile, not just devices, and they watch video on an ever-growing ecosystem of computers and portable devices. These range from personal computers (PCs) and laptops, to a wide variety of mobile devices and phone with features different from traditional set-top boxes (STBs) connected to TVs. Further, the new realities of Social TV ensure that often more than one of these devices will be used at the same time for an enhanced viewing experience.

In addition to mobile TV and social TV, many other real-time applications, such as teleconferencing, and distance learning, require multicast from a single source to multiple receivers. In conventional multicasts, all receivers receive at the same rate. In practice, however, receivers can have widely different characteristics. It becomes desirable to serve each receiver at a rate commensurate with its own demand and capability. One approach to multirate multicast is to use multi-description codes (MDC), dividing source data into equally important streams such that the decoding quality using any subset of the streams is acceptable, and better quality is obtained by more descriptions. A popular way to perform MDC is to combine layered coding with the unequal error protection of a priority encoding transmission (PET) system. Another approach for multirate multicast is to use multi-resolution codes (MRC), encoding data into a base layer and one or more refinement layers. Receivers subscribe to the layers cumulatively, with the layers incrementally combined at the receivers to provide progressive refinement. The decoding of a higher layer always requires the correct reception of all lower layers including the base layer.

The present invention provides multirate multicast with random linear network coding and demand-pushback from the receivers to the source. Network coding allows and encourages mixing of data at intermediate nodes. It has been shown that for a single rate multicast, network coding achieves the minimum of the maximum flow to each receiver; this limit is generally not achievable through traditional routing schemes. For multirate multicast with a total of n-layers to transmit at the source, linear network codes can satisfy requests from all the receivers if the n layers are to be multicasted to all but one receiver. If more than one subscribe to subsets of the n-layers, linear codes cease to be sufficient for layered multicast.

Previous work on multirate multicast with network coding includes the MDC approach, wherein modified PET at the source is catered for network coded systems. Recovery of some layers is guaranteed before full rank linear combinations of all layers are received, and this is achieved at the cost of a lower code rate. Others have studied the problem of Rainbow Network Coding, which incorporates linear network coding into multi-description coded multicast. Still others have studied multi-resolution media streaming, and proposed a polynomial-time algorithm for multicast to heterogeneous receivers. Others have considered multirate multicast in overlay networks, organizing receivers into layered data distribution meshes, and utilizing network coding in each mesh. Yet still others have proposed the Layered Separated Network Coding Scheme to maximize the total number of layers received by all receivers.

In all the previous work, the aggregate rate to all receivers is maximized by solving the linear network coding problem separately for each layer. Specifically, for each layer, a subgraph is selected for network coding by performing linear programming. In other words, only intra-layer network coding is allowed. On the other hand, inter-layer network coding, which allows coding across layers, often achieves higher throughput. Incorporating inter-layer linear network coding into multirate multicast, however, is significantly more difficult, as intermediate nodes have to know the network topology and the demands of all down-stream receivers before determining its network codes.

Others have considered inter-layer network coding by performing integer-programming (IP) flow optimization on "multicast layers i" defined as the combinations of layers from 1 up to i. In addition to IP, which is NP-Hard, this algorithm requires several computations of edge disjoint paths, which are also NP-Hard. It also requires centralized knowledge of the network topology. Such centralized algorithms are difficult to perform on general networks.

SUMMARY

The present method and apparatus for performing network coding for multi-resolution multicast defines an approach to enable multicast to be sent at different rates to adapt to the end device ecosystem. Currently, diverse screen sizes and codecs of the different end devices, mobile and fixed, usually require either multiple transmissions or inefficient encoding of each stream. The presently described methodology, using multi-resolution codes, random linear network coding, and demand-pushback, provides an efficient mechanism to resolve these issues with encoding both at the source and inside the network.

As is described herein, this approach reduces overall bandwidth requirements for transmitting content and uses the structure of video transmission as well as feedback to improve the overall user experience. Multi-resolution codes encode data into a base layer and one or more refinement layers, where receivers subscribe to the layers cumulatively. In the future Internet, dominated by converged video and graphics applications in a varied receiver ecosystem, this type of approach becomes more and more necessary. With intra-layer and inter-layer random linear network codes, such an approach is also ideal for networks that include bottleneck links such as wireless and Digital Subscriber Loop (DSL), as it ensures maximum throughput at each receiver.

In addition to using multi-resolution codes and random linear network codes, the present approach is novel in the sense that it uses a simple push-back (feedback) algorithm to tailor the coding behavior of every node. This approach overcomes the layered multicast limitations of linear codes when more than one receiver subscribes to only the lower layers. This approach also does not require a different code for each layer. The presently described method and apparatus utilize a simple, distributed message-passing algorithm with two stages (push-back and code assignment) to generate network codes for single source multicast of multi-resolution codes. Unlike previous work, this technique allows both intra-layer and inter-layer network coding at all nodes. This push-back algorithm guarantees decodability of the base layer at all receivers. In terms of total rate achieved, with field size as small as $2^{10}$, this algorithm outperforms routing schemes as well as network coding schemes that perform intra-layer coding but not inter-layer coding (coding between layers, a much more complex implementation). The performance gain of using this algorithm increases as the number of receivers increases and as the network grows in size, if an appropriate push-back criterion is used. As the network grows in size, the diversity of receivers also increases. In traditional networking this diversity entails the multiple transmission and the high probability that at least one receiver will not be satisfied. The proposed approach alleviates these. If the push-back criterion is not carefully chosen, naïve inter-layer coding may lead to an inappropriate choice of network code, which can be worse than using only intra-layer network coding.

Embodiments of the invention significantly overcome deficiencies in the prior art and provide mechanisms and techniques that use multi-resolution codes to multicast at different rates to different receivers. Described herein is a distributed, two-stage message passing algorithm to generate network codes for single-source multicast of multi-resolution codes. The goal of this pushback algorithm is to maximize the total rate achieved by all receivers, while guaranteeing decodability of the base layer at each receiver. By conducting pushback and code assignment stages, this algorithm takes advantage of inter-layer as well as intra-layer coding.

In a particular embodiment of a method for utilizing network coding for multi-resolution multicast is presented. This method, however, is not limited to multi-resolution multicast, and can also be applied to multi-description multicast. A network source partitions source content into a base layer and one or more refinement layers. The network source receives a respective one or more push-back messages from one or more network destination receivers, the push-back messages identifying the one or more refinement layers suited for each one of the one or more network destination receivers. The network source computes a network code involving the base layer and a subset (which can be empty subset) of the refinement layers for at least one of the one or more network destination receivers, and transmits the network code to the one or more network destination receivers in accordance with the push-back messages.

Other embodiments include a computer readable medium having computer readable code thereon for utilizing network coding for multi-resolution multicast is presented. The computer readable medium includes instructions for partitioning source content into a base layer and one or more refinement layers. The computer readable medium further includes instructions for network source to receive a respective one or more push-back messages from one or more network destination receivers, the push-back messages identifying the one or more refinement layers suited for each one of the one or more network destination receivers. The computer readable medium further includes instructions for computing a network code involving at least one of the base layer and the one or more refinement layers for at least one of the one or more network destination receivers, and instructions for transmitting the network code to the one or more network destination receivers in accordance with the push-back messages.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides network coding for multi-resolution multicast as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing network coding for multi-resolution multicast as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
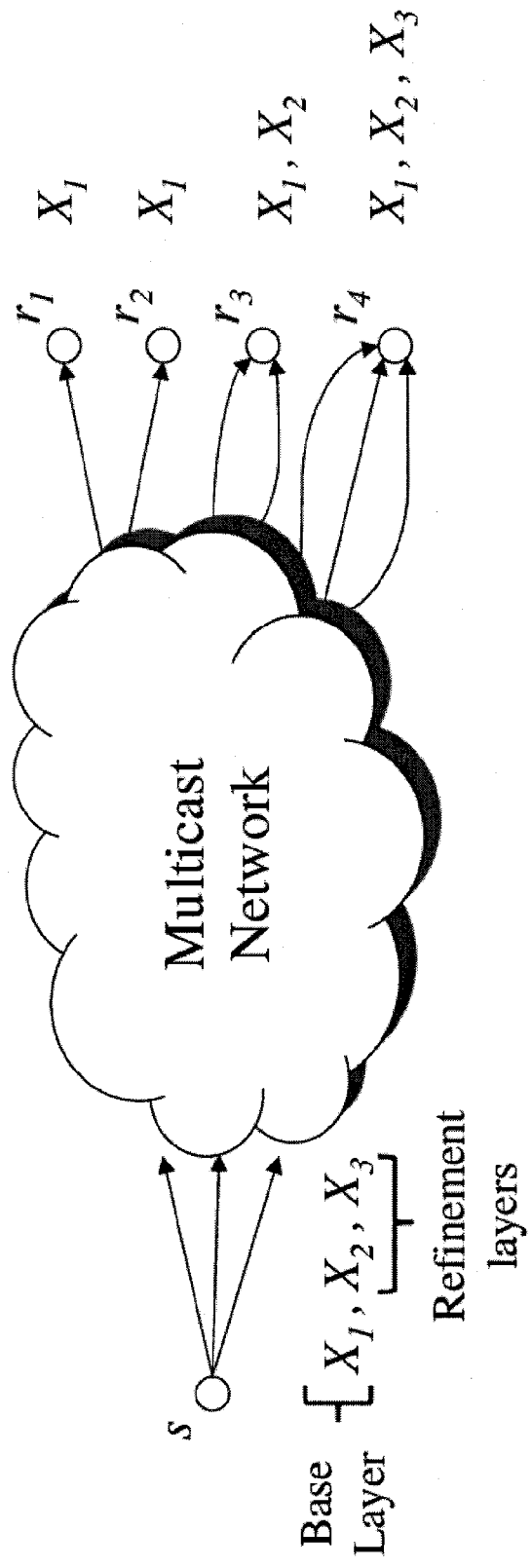
FIG. 1 comprises a block diagram of a multicast network including a source and a plurality of receivers in accordance with embodiments of the invention.

A method and apparatus for utilizing network coding for multi-resolution multicast is presented. For a single-source multicast of multi-resolution codes, the network is modeled by a directed graph $G=(V, E)$, where V is the set of nodes in the network, and E is the set of links as shown in FIG. 1. Each link is of unit capacity. For links with capacity greater than 1, modeling with multiple parallel links is done. There is a subset of receiver nodes, denoted as $R=\{r_1, r_2, \ldots r_n\} \subseteq V$, which wish to receive information from the source node $s \in V$. The source processes are $X_1, X_2, \ldots X_L$, which constitute the multi-resolution code. $X_1$ is the base layer, while the remaining layers constitute the refinement layers. It is important to note that layer $X_i$ without layers $X_1, X_2, \ldots, X_{i-1}$ is not useful for all i. Each layer is of unit rate. Therefore, given a link $e \in E$, one layer (or equivalent coded data rate) can be transmitted on the link e at a time.

The min-cut between s and a node v is denoted as $minCut(v)$, and it is assumed that $minCut(v)$ is known for all $v \in V$, where minCut is defined as the minimum size of any cut in the network between s and v.

The initial work designed a simple and distributed algorithm that provides a coding strategy with the goal of maximizing the total rate achieved by all receivers with the reception of the base layer guaranteed to all receivers.

The pushback algorithm is a distributed algorithm which allows both intra-layer and inter-layer linear network coding. It consists of two stages: pushback and code assignment.

In the pushback stage, messages initiated by the receivers are pushed up to the source, allowing upstream nodes to gather information on the demand of any receiver reachable from them. Messages are passed from nodes to their parents. Initially, each receiver $r_i \in R$ requests for layers $X_1, X_2, \ldots, X_{minCut(ri)}$ to its upstream nodes, i.e., the receiver $r_i$ requests to receive at a rate equal to its min-cut. An intermediate node $v \in V$ computes a message, which depends on the value of $minCut(v)$ and the requests from its children. Node v then pushes this message to its parents, indicating the layers which the parent node should encode together.

The code assignment stage is initiated by the source once pushback stage is completed. Random linear network codes are generated in a top-down fashion according to the pushback messages. The source s generates codes according to the messages from its children: s encodes the requested layers and transmits the encoded data to the corresponding child.

Intermediate nodes then encode/decode the packets according to the messages determined during the pushback stage.

Figure 2:
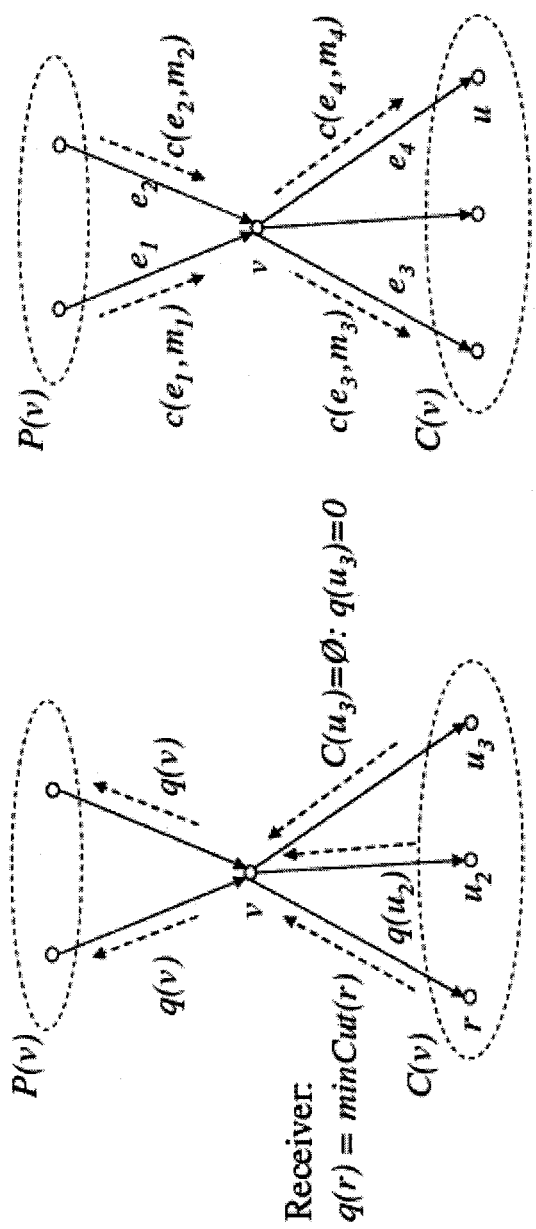
FIG. 2 depicts a diagram showing the pushback stage and code assignment stage at a node in accordance with embodiments of the invention.

To describe the algorithm formally, some additional notations are introduced. For a node v, P(v) is the set of parent nodes, and C(v) its children as shown in FIG. 2. P(v) and C(v) are disjoint since the graph is acyclic. $E_v^{in} = \{(v_1, v_2) \in E | v_2 = v\}$ is the set of incoming links to v, and $E_v^{out} = \{(v_1, v_2) \in E | v_1 = v\}$ is the set of outgoing links from v.

As shown in FIG. 2, the message received by node v from a child $u \in C(v)$ is denoted as q(u), and the set of messages received from its children as $q(C(v)) = \{q(u) | u \in C(v)\}$. A message q(u) means that u requests its parents to code across layers 1 to at most q(u). Once requests are received from all children, v computes its message q(v) and sends the same q(v) to all of its parents. The request q(v) is a function of q(C(v)) and minCut(v), i.e. q(v)=f(q(C(v)),minCut(v)). A pseudocode for the pushback stage at a node $v \in V$ is shown in Algorithm 1. It is important to note that the choice of f(•) is a key feature of the algorithm as it determines the performance. Two different versions of f(•) are presented: min-req criterion and min-cut criterion.

Min-req Criterion:

The min-req criterion, as the name suggests, defines q(v)=f(q(C(v)),minCut(v)) as follows:

$$q(v) = \begin{cases} 0 & \text{if } q(v) = 0 \text{ for all } v \in C(v), \\ q_{min} & \text{otherwise,} \end{cases}$$

where $q_{min} = \min_{q(u) \neq 0, u \in C(v)} q(u)$ is the minimum non-zero q(u) from $u \in C(v)$.

Figure 3:
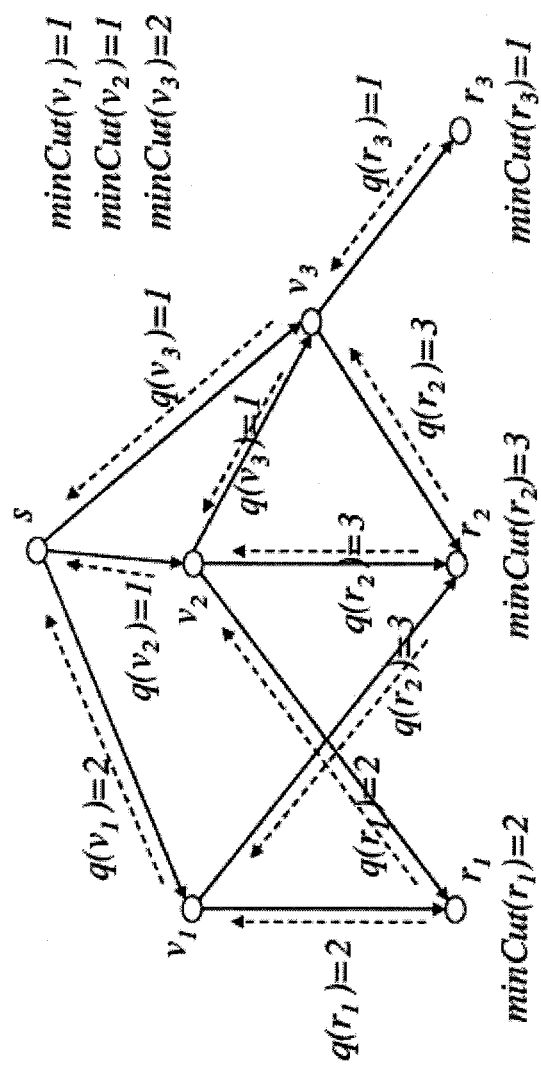
FIG. 3 depicts a diagram showing the pushback stage with the min-req criterion in accordance with embodiments of the invention.

This criterion may seem very pessimistic and naive, as the intermediate nodes serve only the minimum requested by their downstream receivers to ensure the decodability of the base layer. Nonetheless, the performance of this criterion is quite good. An example of pushback with min-req is shown in FIG. 3. Receivers $r_1$, $r_2$, and $r_3$ request their min-cut values 2, 3, and 1, respectively. The intermediate nodes $v_1$, $v_2$, and $v_3$ request the minimum of all the requests received, which are 2, 1, and 1, respectively.

---

Algorithm 1 if v is a receiver then
    q(v) = minCut(v);
end
if v is an intermediate node then
    if C(v) = φ then
        q(v) = 0;
    end
    if C(v) ≠ φ then
        q(v) = f(q(C(v)), minCut(v));
    end
end

---

Min-Cut Criterion:

The min-cut criterion defines the function q(v)=f(q(C(v)), minCut(v)) as follows:

$$q(v) = \begin{cases} q_{min} & \text{if } \text{minCut}(v) \leq q_{min}, \\ \text{minCut}(v) & \text{otherwise,} \end{cases}$$

where $q_{min} = \min_{q(u) \neq 0, u \in C(v)} q(u)$.

Figure 4:
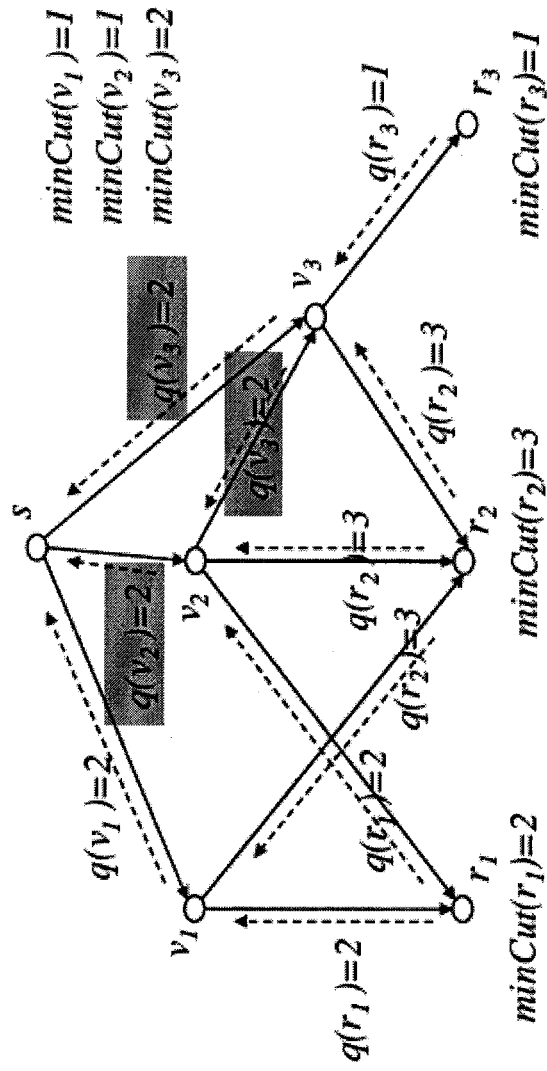
FIG. 4 depicts a diagram showing the pushback stage with the min-cut criterion in accordance with embodiments of the invention.

Note if a node v receives minCut(v) number of linearly independent packets coded across layers 1 to minCut(v), it can decode layers $X_1, X_2, \ldots X_{minCut(v)}$ and act as a secondary source for those layers. Thus, if there is at least one child $u \in C(v)$ that requests fewer than minCut(v) layers, i.e. minCut(v)>$q_{min}$, node v sets its request q(v) to minCut(v). However, if all children request more than minCut(v) layers, node v does not have sufficient capacity to decode the layers requested by its children. Thus, it sets q(v)=$q_{min}$. An example of pushback with min-cut is shown in FIG. 4. The network is identical to that of FIG. 3. Again, the nodes $r_1$, $r_2$, $r_3$, and $v_1$ request 2, 3, 1, and 2, respectively. However, node $v_2$ requests 2, which is the minimum of all the requests it received, and node $v_3$ requests minCut($v_3$)=2.

The second step, called the code assignment stage, is initiated by the source, and the network code is distributed in a top-down fashion to all nodes. Codes are generated using the messages from the push-back stage. For example for fixed receivers or when mobiles move slowly this would not happen often; the opposite would be true in a fully mobile scenario.

This stage is initiated by the source after pushback is completed. As shown in FIG. 2, c(e,m) denotes the random linear network code v transmits to its child $u \in C(v)$, where e=(v,u), and m means that packets on e are coded across layers 1 to m. Note m may not equal to q(u). Algorithm 2 presents a pseudocode for the code assignment stage at any node $v \in V$.

Algorithm 2 considers source, intermediate, and receiver nodes separately. The source always exactly satisfies any requests from its children, while the receivers decode as many consecutive layers as they can. For an intermediate node v connected to the network (P(v)≠∅), v collects all the codes c($e_i$, $m_i$) from its parents and determines m*, the number of layers up to which v can decode. It is possible that v cannot decode any layer, leading to an m* equal to zero. For m*≠0, v can act as a secondary source for layers 1, 2, ..., m* by decoding these layers. In the case where q(u)m*, $u \in C(v)$, v can satisfy u's request exactly by encoding just the layers 1 to q(u). If q(u)>m*, v cannot decode the layers u requested; thus, cannot satisfy u's request exactly. Therefore, v uses a best effort approach and delivers a packet coded across layers, where $m_{max}$ is the closest to q(u)node v can serve without violating u's request, i.e. q(u)≦$m_{max}$. The code assignment stage requires that every node check its decodability to determine m*. This process involves Gauss-Jordan elimination, which is computationally cheaper than matrix inversion required for decoding. Note that only a subset of the nodes needed to perform (partial) decoding.

Figure 5:
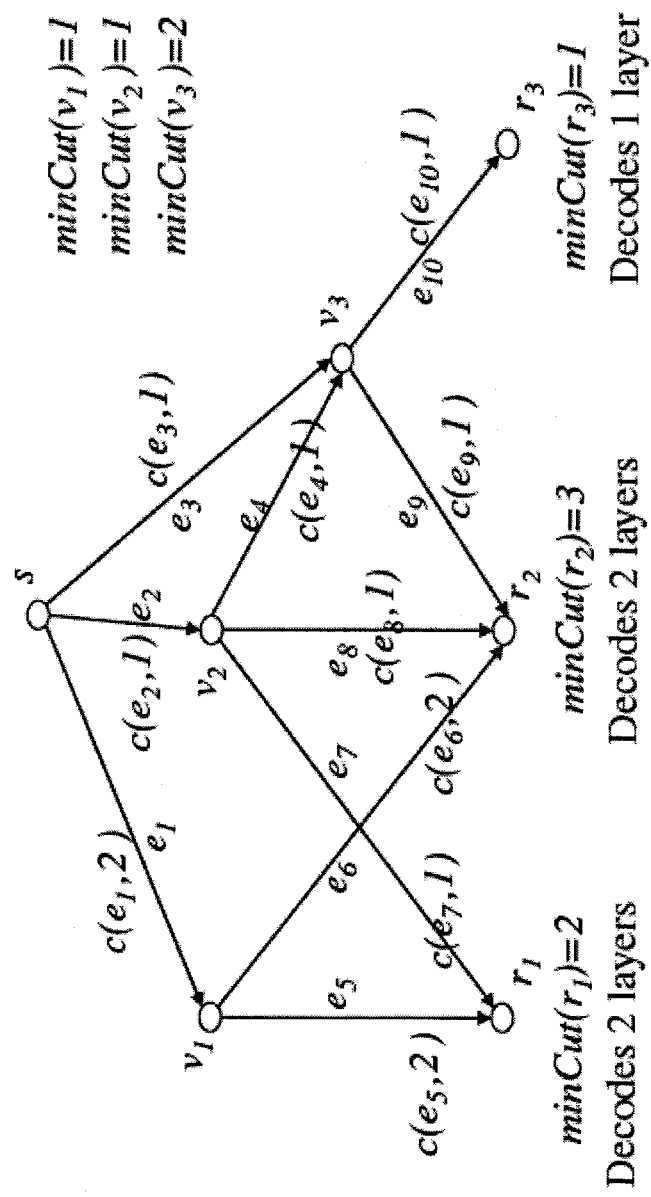
FIG. 5 depicts a diagram showing the code assignment stage with the min-req criterion in accordance with embodiments of the invention.
Figure 6:
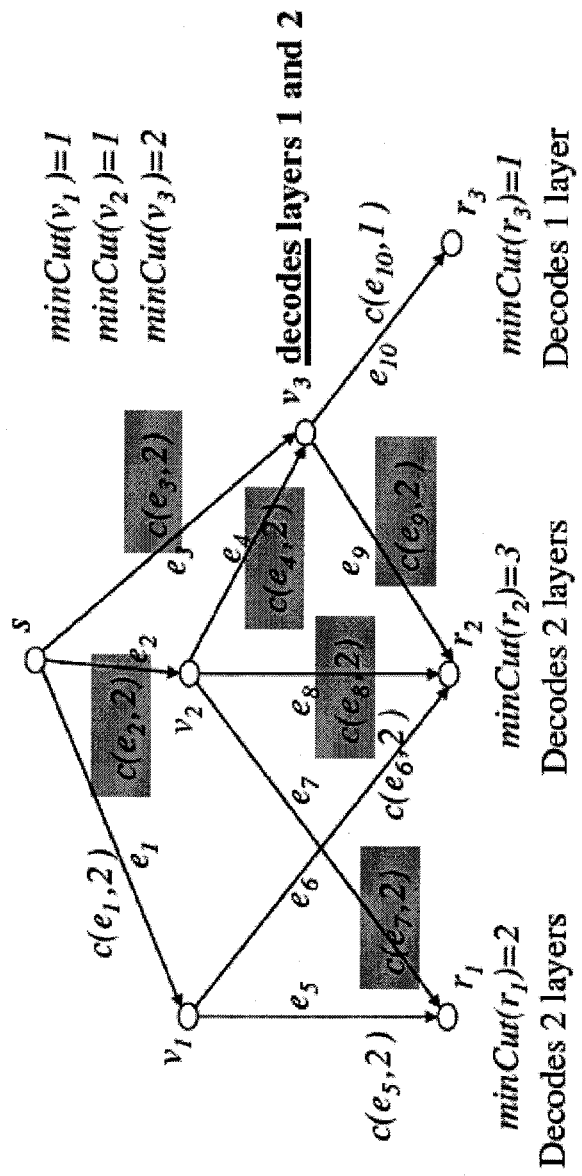
FIG. 6 depicts a diagram showing the code assignment stage with the min-cut criterion in accordance with embodiments of the invention.

FIGS. 5 and 6 show the code assignment stage for the examples in FIGS. 3 and 4. The algorithm for code assignment stays the same, whether min-req or min-cut criterion is used during the pushback stage, but the resulting code assignments are different. Although the throughput achieved in these examples are the same, this is usually not the case.

Algorithm 2: The code assignment stage at node v.

```
if v is the source s then
    foreach edge e = (v, u) ∈ E_v^out do
        v transmits c(e, q(u));
    end
end
if v is an intermediate node then
    if P(v) = φ then
        v sets c(e, 0) for all e ∈ E_v^out;
    end
    if P(v) ≠ φ then
        v receives codes c(e_i m_i), e_i ∈ E_v^in;
        v determines m*, which is the maximum m such
        that X_1, X_2, ... X_m are decodable from c(e_i m_i)'s;
        foreach child u ∈ C(v) do
            Let e = (v, u);
            if q(v) ≤ m* then
                v decodes layers X_1, X_2, ..., X_m*;
                v transmits c(e, q(u));
            end
            if q(u) > m* then
                Let m_max = max_{m_i ≤ q(u)} m_i;
                v transmits c(e, m_max);
            end
        end
    end
end
if v is a receiver then
    v receives codes c(e_i, m_i), e_i ∈ E_v^in;
    v decodes m* layers, which is the maximum m such
    that X_1, X_2, ...X_m are decodable from e(e_i, m_i)'s;
end
```

Generally the min-cut criterion achieves higher throughput than the min-req criterion.

In general, not all receivers can achieve their min-cuts through linear network coding. Nonetheless, it is desirable to guarantee that no receiver is denied service, i.e. although some nodes may not receive up to the number of layers desired, all should receive at least layer 1. Next, it will be shown that the pushback algorithm guarantees decodability of the base layer, $X_1$, at all receivers.

First, it can be shown that if all received codes at v are combinations of at most minCut(v) layers, v can decode at least layer 1.

Assume minCut(v)=n for a node v in G. In the pushback algorithm, if for all $c(e_i, m_i)$, $e_i \in E_v^{in}$, then v can decode at least layer 1 with high probability. In other words, if all received codes at v are combinations of at most n layers, v can decode at least layer 1. Recall that a code $c(e_i, m_i)$ represents coding across layers 1 to $m_i$; if the field size is large, with high probability, the first $m_i$ elements of this coding vector are non-zero, whereas the rest are zeros.

Figure 7:
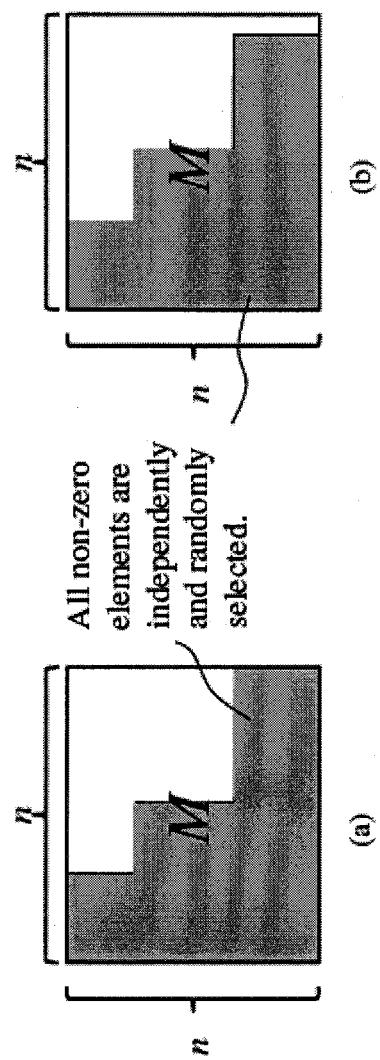
FIG. 7 depicts a diagram showing the coding matrix M in accordance with embodiments of the invention.

Since minCut(v)=n, there exist n edge-disjoint paths from the source s to v, for all links are assumed to have unit capacity. Therefore, v receives from its incoming links at least n codes, each of which can be represented as a row coding vector of length n, since $m_i \leq n$ for all i. The n codes corresponding to the edge-disjoint paths are selected to obtain an n×n coding matrix. For the square coding matrix, its rows are sorted according to the number of non-zero elements per row, obtaining the structure shown in FIG. 7. This sorted matrix is denoted by M, and the unique numbers of non-zero elements in its rows by $c_1, c2, \ldots, c_k$, in ascending order. Since the rows of M are generated along edge-disjoint paths using random linear network coding, the non-zero elements of M are independently and randomly selected.

Figure 8:
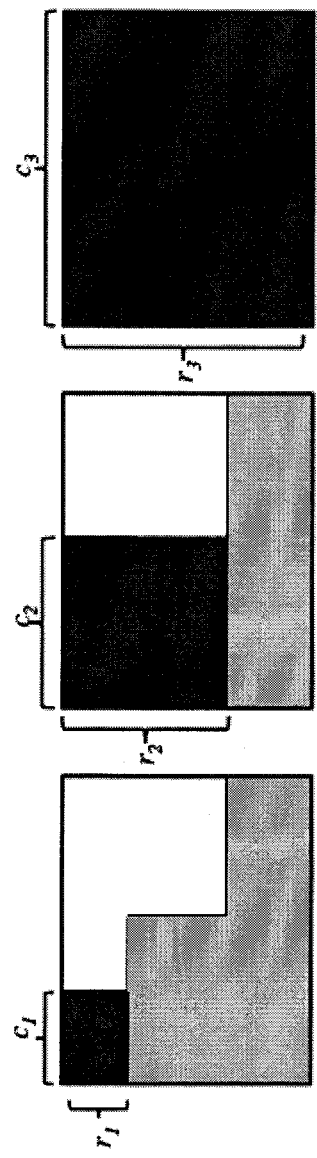
FIG. 8 depicts a diagram showing the coding matrix M including submatrices in accordance with embodiments of the invention.

Next, the upper-left corner submatrices are defined $M_1$, $M_2, \ldots, M_k$ as shown in FIG. 8, where each submatrix $M_i$ is of size $r_i \times c_i$. Specifically, the rows of M with exactly $c_1$ non-zero elements form an $r_1 \times c_1$ submatrix $M_1$; the rows of M with exactly $c_1$ or $c_2$ non-zero elements form the r2×c2 submatrix $M_2$. $M_k$ is of size $r_k \times c_k$, where $r_k = n$, and $c_k \leq n$. Note for any i, if rank($M_1$)=$c_1$, node v can decode layers 1 to $c_1$, i.e., the base layer is decodable. In other words, layer 1 is not decodable at node v only if rank($M_i$)<$c_i$ for all i.

With these definitions, it can be assumed layer 1 is not decodable at node v, and the lemma proven by contradiction. Specifically, it can be proven by induction that this assumption implies $r_i < c_i$ for all i, leading to the contradiction $r_k < c_k$.

For the base case, first consider $M_1$. If layer 1 is not decodable, rank($M_1$)<$c_1$. Recall that elements in $M_1$ are independently and randomly selected; if $r_1 \geq c_1$, with high probability, rank($M_1$)=$c_1$. Therefore, the above assumption implies $r_1 < c_1$ and rank($M_1$)=$r_1$. Next consider $M_2$. Under the assumption that layer 1 is not decodable, rank($M_2$)<$c_2$. Since rank($M_1$)=$r_1$ and $M_2$ includes rows of $M_1$, rank($M_2$)≥$r_1$. Rows $r_1+1$, $r_1+2, \ldots, r_2$ are called the additional rows introduced in $M_2$. If there are more than $c_2-r_1$ additional rows, $M_2$ has full rank, i.e. rank($M_2$)=$c_2$, with high probability. Hence, the number of additional rows in $M_2$ must be less than $c_2-r_1$, implying $r_2 < c_2$.

For the inductive step, consider $M_i$, $3 \leq i \leq k$. Assume that $r_j < c_j$ for all j<i. If layer 1 is not decodable, rank($M_i$)<$c_i$. By similar arguments as above, rank($M_{i-1}$)=$r_{i-1}$, and there must be less than $c_i - r_{i-1}$ additional rows introduced in $M_i$. Thus, $r_i < c_i$. By induction, the total number of rows $r_k = n$ in M is strictly less than $c_k$ n, which is a contradiction. We therefore conclude that node v can decode the base layer. In fact, v can decode at least $c_1$ layers.

Next it will be shown that in the pushback algorithm, for each link e=(v,v'), assume that node v' sends request q(v')=q to node v. Then, the code c(e,m) on link e (from node v to v') is coded across at most q layers, i.e. m≤q.

Figure 9:
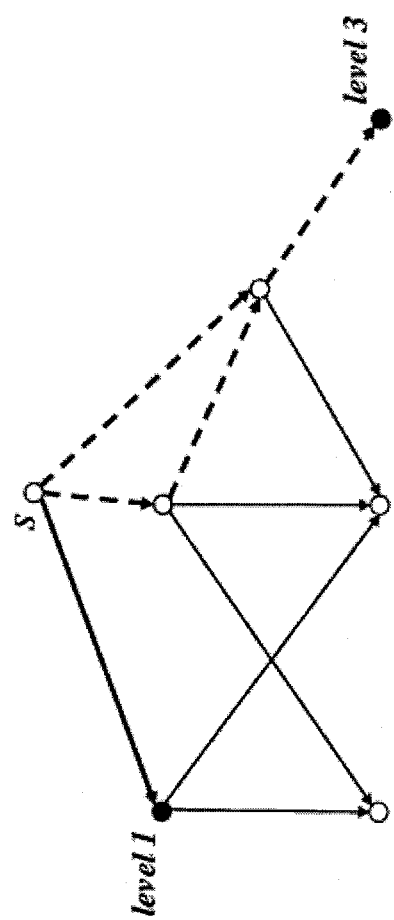
FIG. 9 depicts a diagram showing a level 1 and a level 3 node in a network in accordance with embodiments of the invention.

First, define the notion of levels. A node u is in level i if the longest path from s to u is i, as shown in FIG. 9. Since the graph is acyclic, each node has a finite level number. Induction is used on the levels to prove that this lemma holds for both min-req and min-cut criteria.

For the base case, if v is in level 1, it is directly connected to the source, and receives a code across exactly q layers on e from s. For the inductive step, assume that all nodes in levels 1 to i, $1 \leq i < k$, get packets coded across layers 1 to at most their request. Assume v is in level i+1. Let v∈P(v'); therefore, v is in level j≤i. Let $q_{min}$ be the smallest non-zero request at v, that is $q_{min} = \min_{q(u) \neq 0, u \in C(v)} q(u)$.

For the min-req criterion, v always sends request q(v)=$q_{min}$ to its parents, and the codes v receives are linear combinations of at most $q_{min}$ layers. Therefore, the code v sends to its children is coded across at most $q_{min}$ layers, where q=q(v')≥$q_{min}$. In other words, the code received by v' is coded across at most q layers.

For the min-cut criterion, if $q_{min}$>minCut(v), node v requests q(v)=$q_{min}$ to its parents. By the same argument as that for the min-req criterion, v' receives packets coded across at most q layers. If $q_{min}$≤minCut(v), v requests q(v)=minCut(v). According to the code assignment stage, if v cannot satisfy request q exactly, it will send out a linear combination of the layers it can decode. Since v is in level j≤i, v receives codes across layers 1 to at most minCut(v). By the previously proven lemma, node v can decode at least the base layer.

Thus, we conclude that node v is always able to generate a code for node v' such that it is coded across layers 1 to at most q.

In the pushback algorithm, every receiver can decode at least the base layer. The receiver with min-cut n receives linear combination of at most n layers. The receiver, therefore, can decode at least the base layer.

To evaluate the effectiveness of the pushback algorithm, the algorithm was implemented it in Matlab, and the performance compared with both routing and intra-layered network coding schemes. Random networks were generated, with a fixed number of receivers randomly selected from the vertex set. Two metrics are considered in evaluating the performance:

$$\% \text{ Happy Nodes} = \frac{100}{\# \text{ of trials}} \sum_{\text{all trials}} \frac{\# \text{ of receivers that achieve min-cut}}{\# \text{ of receivers}},$$

$$\% \text{ Rate Achieved} = 100 \frac{\sum_{\text{all trials}} \text{total rate achieved}}{\sum_{\text{all trials}} \text{total min-cut}}$$

The % Happy Nodes metric is the average percentage of receivers that achieved their min-cuts, i.e. receivers that received the service they requested. The % Rate Achieved metric gives a measure of what percentage of the total requested rate (equal to sum of min-cuts) was delivered to the receivers over all trials. It is important to note that the optimal achievable rates (denoted OPT) for multirate multicast are generally unknown for a network. The min-cut is the theoretical upper bound on OPT. Therefore, % Rate Achieved is a lower bound on the total rate achieved in terms of OPT, i.e.

$$\% \text{ Rate Achieved} \leq 100 \frac{\sum_{\text{all trials}} \text{total rate achieved}}{OPT}.$$

Recall that this total rate achieved is what was intended to be maximized with the proposed algorithm.

As an example, consider two possible cases where the (min-cut, achieved-rates) pairs are ([1,1,2],[1,1,1]) and ([2,2,3],[2,2,2]). In both cases, the demand of a single receiver is missed by one layer, but the corresponding fractions of rates achieved are ¾ and 6/7 respectively. Using only the % Happy Nodes metric would tell us that ⅓ of the receivers did not receive all requested layers. However, the % Rate Achieved metric provides a more accurate measure of how 'unhappy' the overall network is.

One scheme considered for comparison is point-to-point routing. This algorithm considers each multicast as a set of unicasts. The source node s first multicasts the base layer $X_1$ to all receivers. To determine the links used for layer $X_1$, s computes the shortest path to each of the receivers separately. Given the shortest paths to all receivers, s then uses the union of the paths to transmit the base layer. Note the shortest path to receiver $r_i$ may not be disjoint with the shortest path to receiver $r_j$. After transmitting layer $X_{i-1}$, $2 \leq i \leq L$, source s uses the remaining network capacity to transmit the next refinement layer $X_i$ to as many receivers as possible. First, s updates the min-cut to all receivers and identifies receivers that can receive $X_i$. Let $R' = \{r_{i_1}, r_{i_2}, \ldots\}$ be the set of receivers with updated min-cut greater than 1 and, therefore, can receive layer $X_i$. The source s then computes the shortest paths to receivers in R'. The union of these paths is used to transmit the refinement layer. This process is repeated until no receiver can be reached or the layers are exhausted.

A second scheme considered for comparison is Steiner tree routing. This algorithm computes the minimal-cost tree connecting source s and all the receivers. We assume that each link is of unit cost. For the base layer $X_1$, s computes and transmits on the Steiner tree connecting to all receivers. For each new refinement layer $X_i$, s computes a new Steiner tree to receivers with updated min-cuts greater than zero. This process is repeated until no receiver can be reached or the layers are exhausted.

It is important to note that Steiner tree routing algorithm is an optimal routing algorithm—it uses the fewest number of links to transmit each layer. Unlike the point-to-point algorithm, this algorithm may make routing decisions that are not optimal to any single receiver, i.e. the source may use a non-shortest path to communicate to a receiver, but it uses fewer links globally. However, this optimality comes with a cost: the problem of finding a Steiner tree is NP-complete.

A third scheme considered for comparison is intra-layer network coding. This third algorithm uses linear coding on each layer separately. It iteratively solves the linear programming problem for linear network coding for layer $X_i$ with receivers $R_i = \{r \in R | \text{minCut}(r) \geq 1\}$ where i=1 and $R_1 = R$ initially. After solving the linear program for layer $X_i$, the algorithm increments i, updates the link capacities, and performs the next round of linear programming.

The pushback algorithm was implemented with two different message passing schedules.

1) Sequential: for the pushback stage, each node in the network sends a request to its parents after request messages from all its children have been received. For the code assignment stage, each node sends a code to its children after receiving codes from all its parents.

2) Flooding: for the pushback stage, each node updates its request to its parents upon reception of a new message from its children. For the code assignment stage, each node sends a new code to its children after receiving a new message from any of its parent nodes. This allows an update mechanism that converges to the same solution as sequential message passing, where the convergence time depends on the diameter of the graph.

Another important issue is the procedure to check decodability at each node. In general, Gauss-Jordan elimination on the coding matrix in a field of size p is necessary to determine which layers are decodable at a node after the codes are assigned. However, this is not the case for 2-layer multi-resolution codes (L=2). We define pattern of coding coefficients for a node with 5 incoming links as $[a_1, a_2, \ldots, a_8]$, where $a_i$ represents the number of layers combined in the i-th incoming link. If a node receives only the base layer on all incoming links, i.e. the pattern of coding coefficients is $[1, 1, \ldots, 1]$, it can decode the base layer. If at least one of the incoming links contains a combination of two layers, i.e. the pattern of coding coefficients is one of the following: $[1, \ldots, 1, 2], [1, \ldots, 1, 2, 2], \ldots, [2, \ldots, 2]$, both layers can be decoded. Thus, for L=2, the pattern of coding coefficients indicates decodability. Note that using the pattern of coding coefficients is equivalent to using Gauss-Jordan elimination with infinite field size.

In more general cases with L>2, the pattern of coding coefficients is no longer sufficient. For example, a node with 4 incoming links of unit rate can have a min-cut of at most 4. Assume that this node has a min-cut of 3, and that this node is assigned a coding-coefficient pattern of [1, 1, 3, 3]. If coding vectors are linearly independent, all layers are decodable. However, it is possible that the third and the fourth links, both combining three layers, are not from disjoint paths, i.e. linearly dependent combinations. Then, Gauss-Jordan elimination is necessary to check that only the first layer is decodable.

In subsequent sections, simulation results for 2 and 3-layer multi-resolution codes are presented. However, our algorithm is not limited to 2 and 3-layers; it can be applied to general n-layer multi-resolution codes.

The simulations for 2-layer multi-resolution code were carried out for random directed acyclic networks. 1000 trials were averaged for each data point on the curves plotted in this section. The networks were generated such that the min-cuts and the in-degrees of all nodes were less than or equal to 2.

Figure 10:
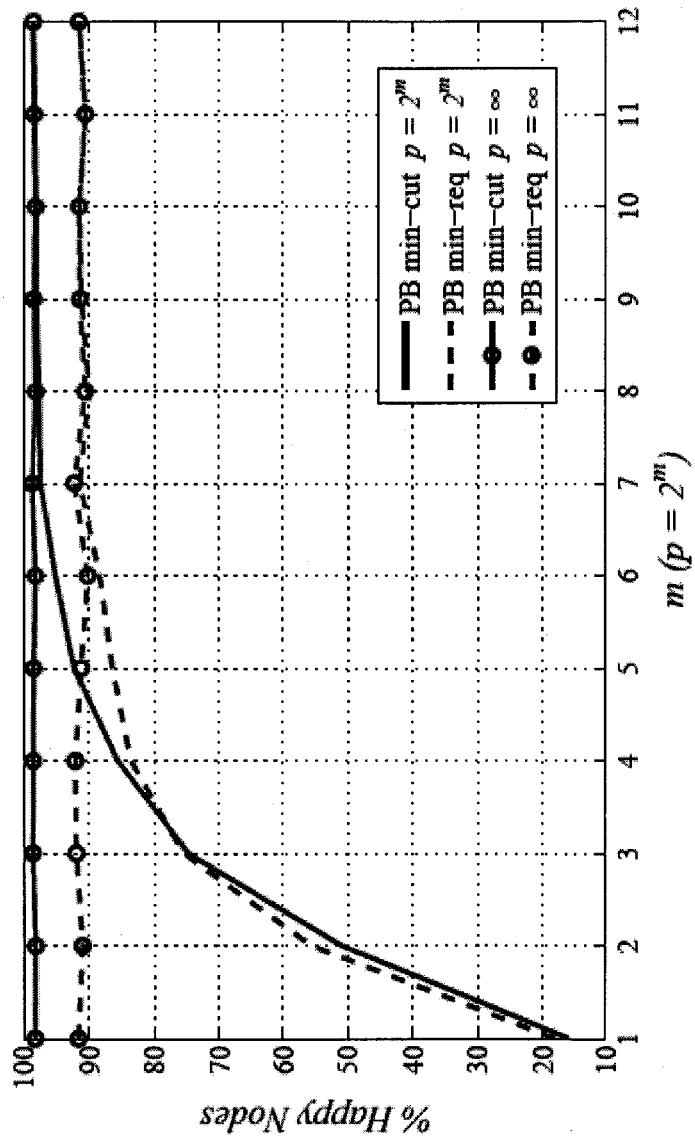
FIG. 10 depicts a graph showing the performance of the pushback scheme as the field size varies, in a network in accordance with embodiments of the invention.

The patterns of coding coefficients are sufficient to check decodability for 2-layer multi-resolution codes, and it is equivalent to using Gauss-Jordan elimination with an infinite field size. FIG. 10 shows the effect of field size in a network with 25 nodes and 5 receivers by performing Gauss-Jordan elimination at every node during the code assignment stage with varying field size p. It also shows the average performance in terms of % Happy Nodes when using the pattern of coding coefficients to check decodability. In essence, the performance of our system using a field size p is compared to that of an infinite field size. Observe that even for moderately small field sizes, such as $p \geq 2^8$, the pushback algorithm performs close to that of the system operating in an infinite field.

From FIG. 10, it can be seen that the min-cut criterion performs considerably better than the min-req criterion for large field sizes. However, for small field sizes ($p \leq 2$), the min-req criterion is slightly better. This is because it forwards the minimum of the requests received at any node. For L=2, there will be more nodes requesting only the base layer when using the min-req criterion than when using the min-cut criterion. Thus, networks using the min-req criterion will have more links carrying only the base layer, which helps improve redundancy for the receivers. This allows several paths to carry the same information, ensuring the base layer is decodable at the receivers. By comparison, the min-cut criterion tries to combine both layers on as many links as possible. When the field size is large, both layers are decodable with high probability; when the field size is small, the probability of generating linearly dependent codes is high, consequently preventing decodability of both layers at a subset of receivers.

Figure 11:
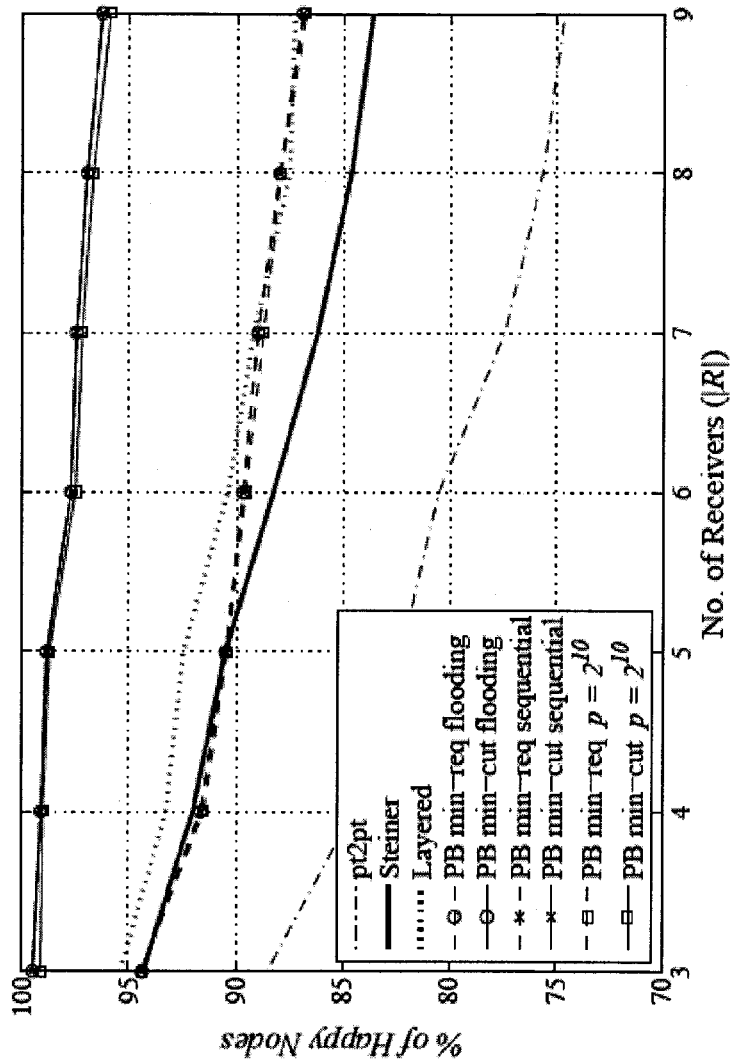
FIG. 11 depicts a graph showing the performance of the various schemes when the number of receivers is increased in accordance with embodiments of the invention.
Figure 12:
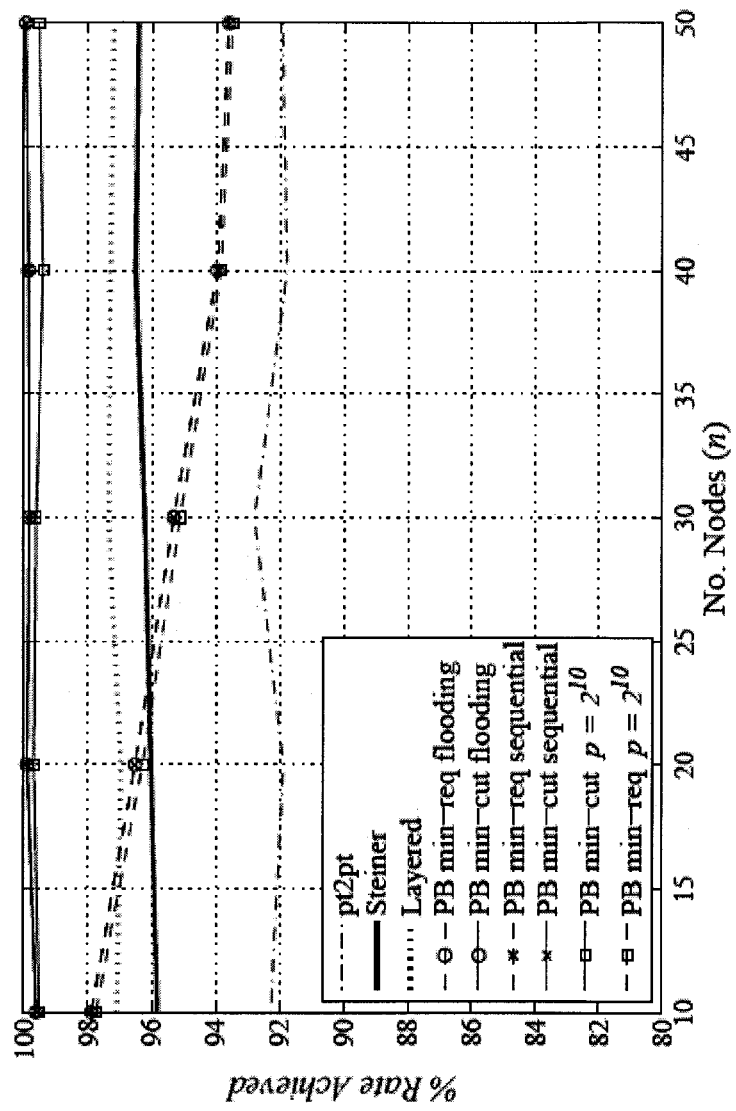
FIG. 12 depicts a graph comparing the different schemes when the number of receivers is fixed, but the network grows in size in accordance with embodiments of the invention.

FIGS. 11 and 12 compare the performance of the various schemes for L=2 in terms of the two metrics % Happy Nodes and % Rate Achieved. The pushback algorithm is compared to the Point-to-point Routing Algorithm ('pt2pt'), the Steiner Tree Routing Algorithm ('Steiner'), and the Intra-layer Network Coding Algorithm ('Layered'). Two versions of pushback were implemented: flooding and sequential message passing approaches. The flooding schemes with an infinite field size are labeled 'PB min-req flooding' and 'PB min-cut flooding' for the min-req and min-cut criteria, respectively. The sequential message passing schemes with an infinite field size are labeled 'PB min-req sequential' and 'PB min-cut sequential.' Finally, pushback using a moderate field size of $p=2^{10}$ are labeled 'PB min-req $p=2^{10}$' and 'PB min-cut $p=2^{10}$.'

FIG. 11 shows the performance of the various schemes when the number of receivers is increased. 'PB min-cut' has the best performance overall. Both flooding and sequential message passing approaches behave similarly. Furthermore, using a moderate field size of $p=2^{10}$ yields results close to that of an infinite field size (for both min-cut and min-req). The performance of the various schemes follows a similar trend for both metrics % Happy Nodes and % Rate Achieved. In addition, FIG. 11 illustrates that the gaps between the min-cut criterion and 'pt2pt', 'Steiner' and 'Layered' increase with the number of receivers. Note that the gap between the min-cut and the min-req criteria increases more slowly than the gap between the min-cut and the other schemes.

FIG. 12 compares the different schemes when the number of receivers is fixed, but the network grows in size. 'PB min-cut' outperforms the intra-layer network coding and the routing schemes; it also consistently achieves close to 100% for both % Happy Nodes and % Rate Achieved while the second best scheme ('Layered') achieves at most 96% and 97% for the two metrics.

FIG. 12 also shows that the min-cut criterion is very robust to the size of the network. In fact, the performance improves as more nodes are added. However, the min-req degrades with the number of nodes. This is because with min-req, the requests from receivers with min-cut equal to 1 limits the rate of other receivers. As the network becomes larger, this flooding of base layer requests has a more significant effect on the throughput since more resources are wasted in delivering just the base layer. This indicates that the choice of network code can greatly impact the overall network performance, depending on its topology and demands. An inappropriate choice of network code can be detrimental, as shown by 'PB min-req'; however, an intelligent choice of network code can improve the performance significantly, as shown by 'PB min-cut'.

Similarly to the 2-layer case, for 3-layer multi-resolution codes, random networks were generated to evaluate the pushback algorithm. For each data point in the plots, we averaged 1000 trials. The min-cuts and the in-degrees of all nodes were less than or equal to 3. Recall that with 3 layers, the patterns of coding coefficients are not sufficient for checking the decodability of incoming packets. Instead, Gauss-Jordan elimination is necessary at every node during the code assignment stage.

Figure 13:
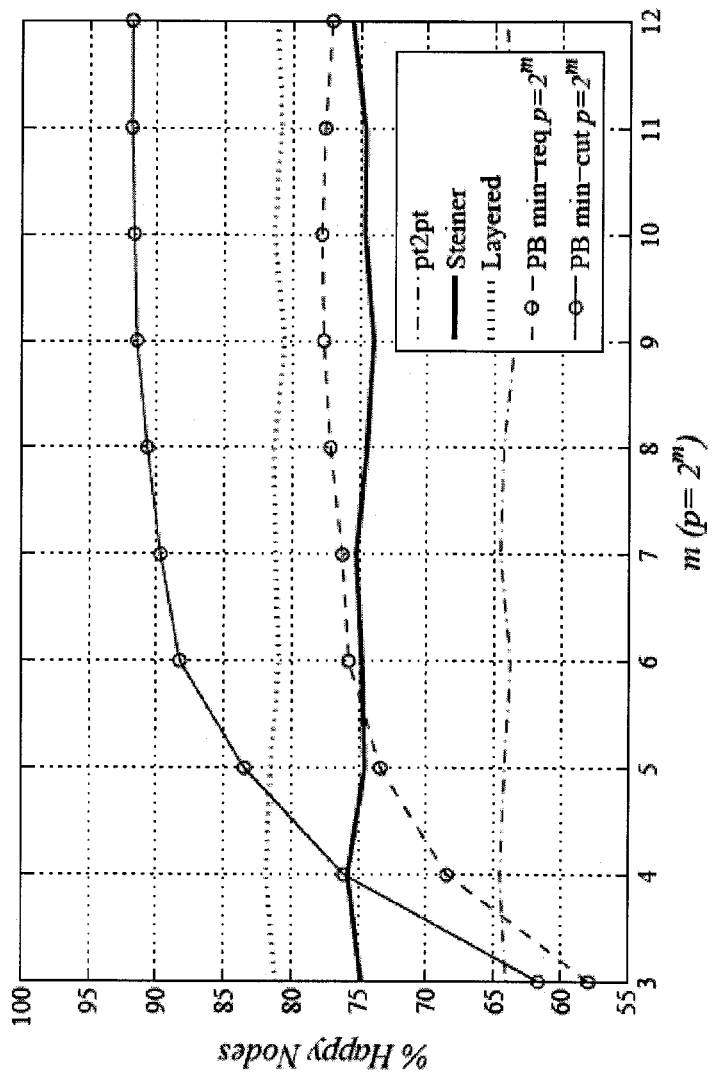
FIG. 13 depicts a graph showing the effect of field size in a network of 25 nodes and 9 receivers in accordance with embodiments of the invention.

FIG. 13 shows the effect of field size in a network of 25 nodes and 9 receivers. 'PB min-cut' outperforms routing and intra-layer coding schemes with a field size of $p=2^5$. In terms of % Happy Nodes, 'PB min-cut' achieves roughly 92% when the field size is large enough, while the intra-layer coding scheme only achieves about 82%. FIG. 13 also shows that intra-layer coding scheme still outperforms the routing schemes, even when optimal multicast routing is used for each layer. Our pushback algorithm achieves considerably higher gains by using inter-layer in addition to intra-layer coding.

Figure 14:
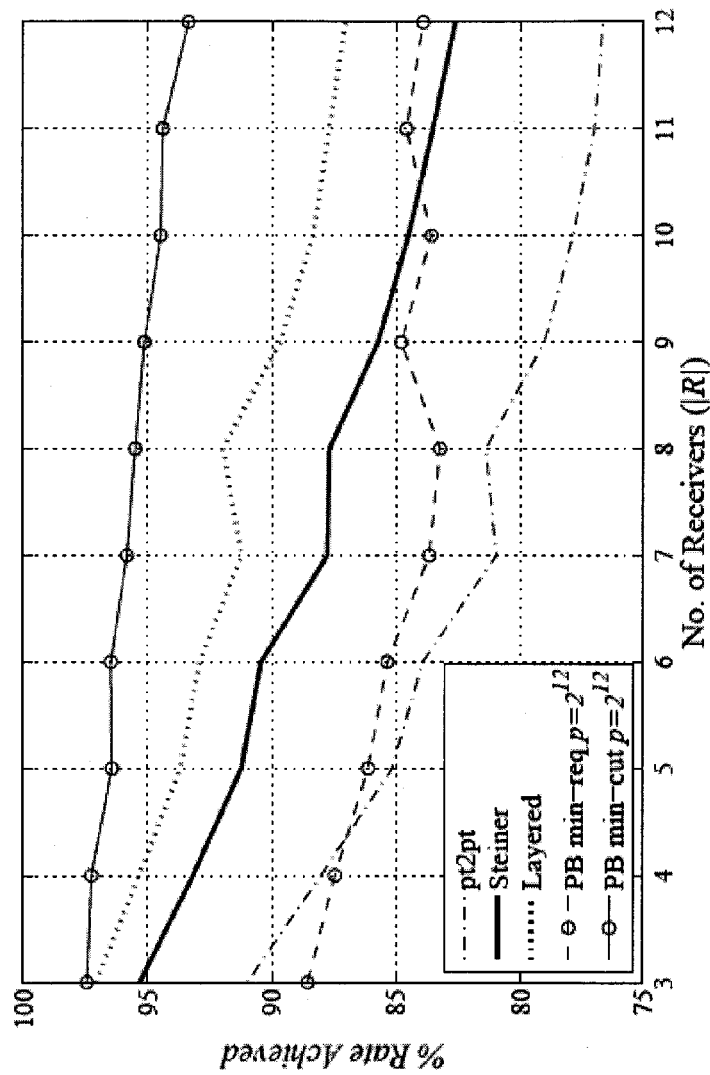
FIG. 14 depicts a graph showing the performance of different schemes as the number of receivers increases in accordance with embodiments of the invention.

As the number of receivers increases, more demands need to be satisfied simultaneously. It is therefore expected that the overall performance of multicast schemes will degrade with the number of receivers. This can be observed in FIG. 14. However, the performance gap between 'PB min-cut' and 'PB min-req' is approximately constant, while the performance gap over other schemes increases. This means that our algorithm is more robust to changes in the number of receivers than the other schemes, an important property for systems that aim to provide service to a large number of heterogeneous users.

Figure 15:
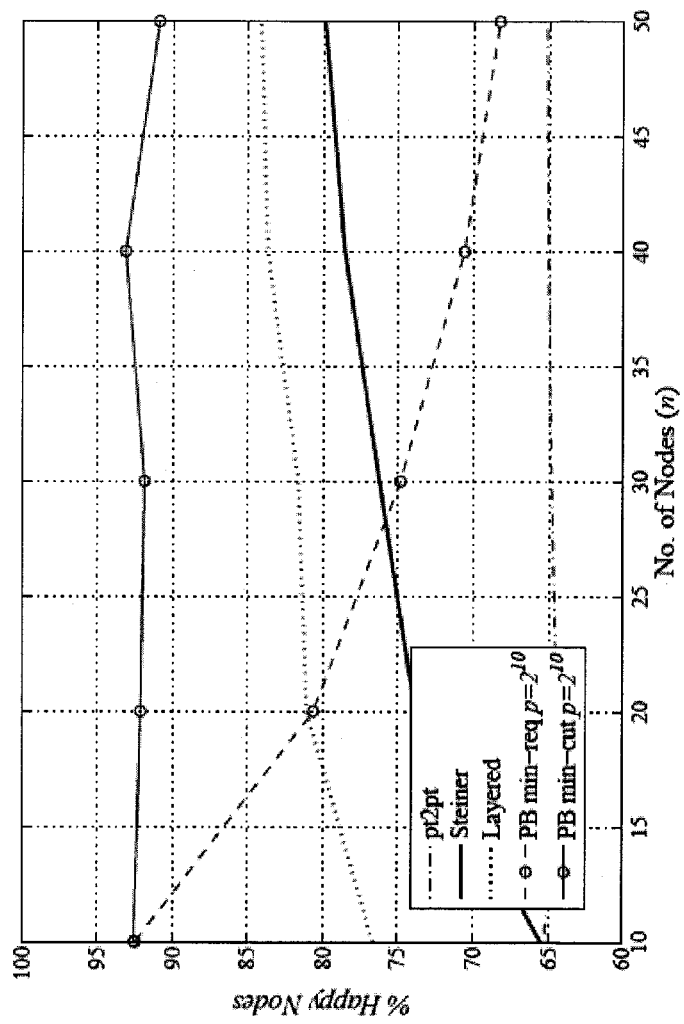
FIG. 15 depicts a graph showing the performance of the different schemes as the network grows in size in accordance with embodiments of the invention.

FIG. 15 shows the performance of the different schemes as the network grows in size. As more nodes are added, there are more disjoint paths within the network for Steiner tree routing and intra-layer coding to use. Hence the performance of these schemes improves. The opposite behavior occurs for 'PB min-req', i.e. the % Happy Nodes decreases as the network size increases. This result is similar to that of FIG. 12 for 2-layer case. As the network size increases, it becomes more likely that a small request by one receiver suppresses higher requests by many other receivers. Hence, pushback with the min-req criterion quickly deteriorates in terms of % Happy Nodes.

The use of "push-back" can improve the overall performance of video transmission. This is one of the axes that can be used in an "intelligent strategy". The question is however how much feedback and of which type is necessary. For example, the TCP protocol uses feedback to achieve rate and congestion control by acknowledging (ACK) received packets. This would seem to defeat network coding solutions since the decoding of the encoded packet block would delay the TCP ACKS and convince the source that there is congestion hence sending it in congestion avoidance mode. However recent work has shown that by judiciously both decoding groups of packets in a progressive manner and introducing a concept of "seen" packet, TCP throughput can be improved considerably.

In this scheme, random linear network coding masks link losses from TCP in order to prevent unnecessary TCP transmitting window back-off. The algorithm uses a novel ACK design that accounts for mixing (coding) of packets with each other. A packet can be ACKed even if it not fully revealed hence keeping a steady flow of ACKs to the source and operating TCP under optimal conditions. The TCP/NC does not need to be implemented end to end but only at certain nodes to profit from the throughput gains; however, TCP/NC does not require intermediate nodes performing coding operations to profit from the coding throughput gains.

This approach results in higher goodput when the loss rate is high hence this mechanism offers a lot of promise for the wireless and the peer-to-peer Internet. Simulations over a lossy medium also show that the in-network re-encoding outperforms the end to end operation but that even with network coding available at the source only gains are considerable.

By combining the multi-resolution codes in the network to the existing multi-description codes at the source and the knowledge of the protocol at the applications, a "framework" of source and rateless network codes targeted at specific combinations of content and receiver capabilities (screen resolution, CPU/codecs, HTTP/TCP, and even other features like power) is provided. It can include fountain codes like raptor codes and also multilayer network coding to match the coding the dynamic behavior of the network both in terms of congestion management and mobility model of the receivers. This results in a form on inner/outer coding applied to video. The feedback/pushback loop can use standards in signaling to send the receiver ecosystem information back to the senders.

Figure 16A:
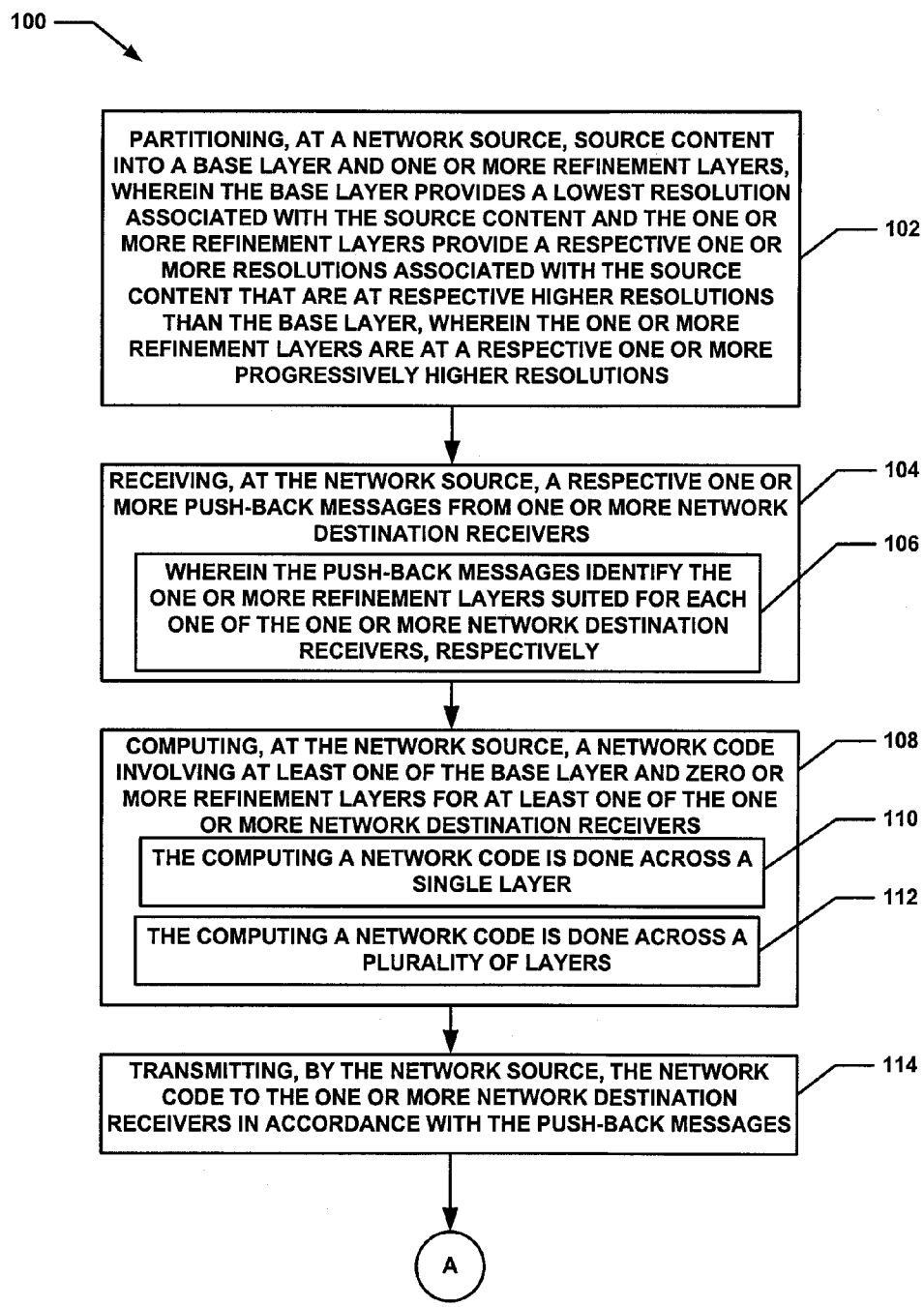
FIGS. 16A and 16B depict a flow diagram of a particular embodiment of a method of performing network coding for multi-resolution multicast in accordance with embodiments of the invention.
Figure 16B:
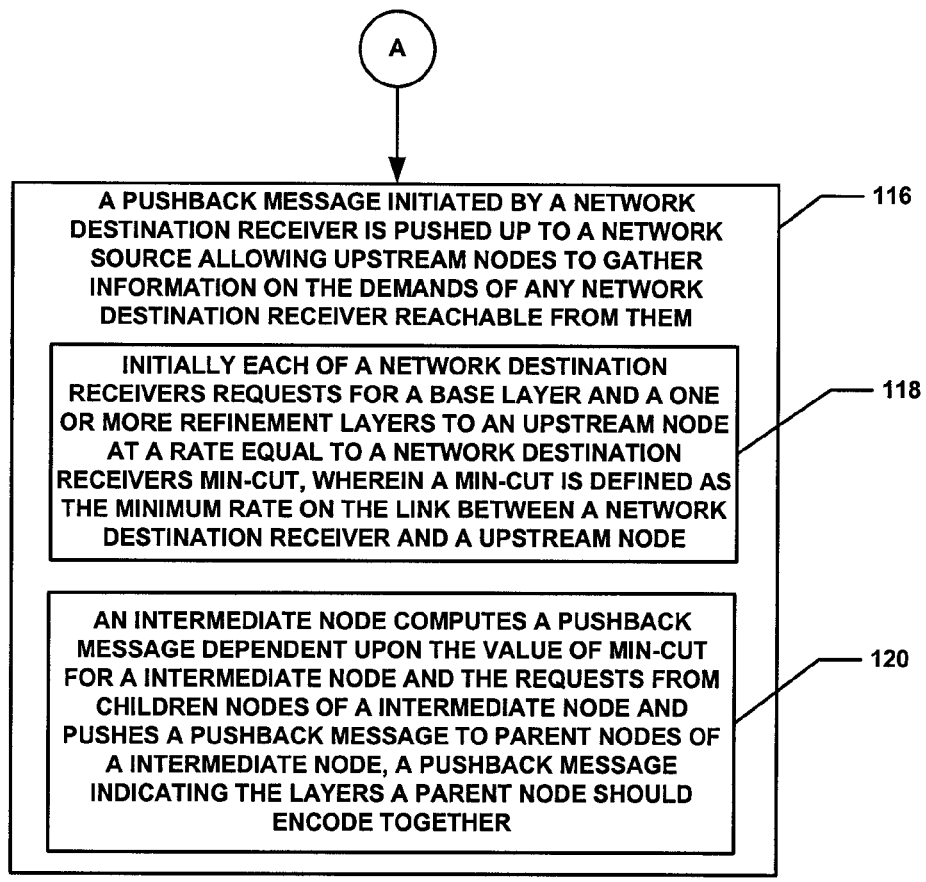

A flow chart of the presently disclosed method is depicted in FIGS. 16A and 16B. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 16A and 16B a method 100 for performing network coding for multi-resolution multicast is shown. Method 100 begins with processing block 102 which discloses partitioning, at a network source, source content into a base layer and one or more refinement layers, wherein the base layer provides a lowest resolution associated with the source content and the one or more refinement layers provide a respective one or more resolutions associated with the source content that are at respective higher resolutions than the base layer, wherein the one or more refinement layers are at a respective one or more progressively higher resolutions.

Processing block 104 states receiving, at the network source, a respective one or more push-back messages from one or more network destination receivers. As shown in processing block 106, the push-back messages identify the one or more refinement layers suited for each one of the one or more network destination receivers, respectively.

Processing block 108 states computing, at the network source, a network code involving the base layer and a subset (which can be empty subset) of the refinement layers for at least one of the one or more network destination receivers. As shown in processing blocks 110 and 112, the computing a network code can be done across a single layer, or the computing a network code can be done across a plurality of layers.

Processing block 114 discloses transmitting, by the network source, the network code to the one or more network destination receivers in accordance with the push-back messages.

Processing continues with processing block 116 which states the pushback message initiated by the network destination receiver is pushed up to the network source allowing upstream nodes to gather information on the demands of any network destination receiver reachable from them. As further shown in processing block 118, initially each of the network destination receivers requests for the base layer and a subset (including the empty subset) of the refinement layers to an upstream node at a rate equal to the network destination receivers min-cut, wherein the min-cut is defined as the minimum rate on the link between the network destination receiver and the upstream node. As further recited by processing block 120, an intermediate node computes a pushback message dependent upon the value of min-cut for the intermediate node and the requests from children nodes of the intermediate node and pushes the pushback message to parent nodes of the intermediate node, the pushback message indicating the layers the parent node should encode together.

As described above, the present method and apparatus for performing network coding for multi-resolution multicast defines an approach to enable multicast to be sent at different rates to adapt to the end device ecosystem. The presently described methodology, using multi-resolution codes, random linear network coding, and demand-pushback, provides an efficient mechanism to resolve these issues with encoding both at the source and inside the network. As is described herein, this approach reduces overall bandwidth requirements for transmitting content and uses the structure of video transmission as well as feedback to improve the overall user experience. With intra-layer and inter-layer random linear network codes, such an approach is also ideal for networks that include bottleneck links such as wireless and DSL, as it ensures maximum throughput at each receiver.

The devices or computer systems that integrate with the processors may include, for example, a personal computers, workstations (e.g., SUN® computers, HP® computers), personal digital assistants (PDAs), handheld devices such as cellular telephones, laptops, handheld computers, or another devices capable of being integrated with a processors that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of network coding comprising:
    partitioning, at a network source, source content into a base layer and one or more refinement layers, wherein the base layer provides a lowest resolution associated with the source content and the one or more refinement layers provide a respective one or more resolutions associated with the source content that are at respective higher resolutions than the base layer, wherein the one or more refinement layers are at a respective one or more progressively higher resolutions;
    receiving, at said network source, a respective one or more push-back messages from one or more network destination receivers;
    computing, at said network source, a network code involving said base layer and said one or more refinement layers for at least one of said one or more network destination receivers, wherein said network code comprises a random linear network code, said random linear network code comprising random linear combinations of at least a portion of said base layer and zero or more of said refinement layers; and
    transmitting, by said network source, said network code to said one or more network destination receivers in accordance with said push-back messages.

2. The method of claim 1 wherein said computing a network code is done across a plurality of layers.

3. The method of claim 1 wherein the push-back messages identify the one or more refinement layers suited for each one of the one or more network destination receivers, respectively.

4. The method of claim 1 wherein said pushback message initiated by said network destination receiver is pushed up to said network source allowing upstream nodes to gather information on the demands of any network destination receiver reachable from them.

5. The method of claim 4 wherein initially each of said network destination receivers requests for said base layer and said one or more refinement layers to an upstream node at a rate equal to said network destination receivers min-cut, wherein said min-cut is defined as the minimum rate on the link between said network destination receiver and said upstream node.

6. The method of claim 5 wherein an intermediate node computes a pushback message dependent upon the value of min-cut for said intermediate node and the requests from children nodes of said intermediate node and pushes said pushback message to parent nodes of said intermediate node, said pushback message indicating the layers said parent node should encode together.

7. A non-transitory computer readable storage medium having computer readable code thereon for utilizing network coding for multi-resolution multicast, the medium including instructions in which a computer system performs operations comprising:

partitioning, at a network source, source content into a base layer and one or more refinement layers, wherein the base layer provides a lowest resolution associated with the source content and the one or more refinement layers provide a respective one or more resolutions associated with the source content that are at respective higher resolutions than the base layer, wherein the one or more refinement layers are at a respective one or more progressively higher resolutions;

receiving, at said network source, a respective one or more push-back messages from one or more network destination receivers;

computing, at said network source, a network code involving at least one of said base layer and said one or more refinement layers for at least one of said one or more network destination receivers wherein said network code comprises a random linear network code, said random linear network code comprising random linear combinations of at least a portion of said base layer and zero or more of said refinement layers; and transmitting, by said network source, said network code to said one or more network destination receivers in accordance with said push-back messages.

8. The computer readable storage medium of claim 7 wherein said computing a network code is done across a plurality of layers.

9. The computer readable storage medium of claim 7 wherein the push-back messages identify the one or more refinement layers suited for each one of the one or more network destination receivers, respectively.

10. The computer readable storage medium of claim 7 wherein a pushback message initiated by said network destination receiver is pushed up to said network source allowing upstream nodes to gather information on the demands of any network destination receiver reachable from them.

11. The computer readable storage medium of claim 10 wherein initially each of said network destination receivers requests for said base layer and said one or more refinement layers to an upstream node at a rate equal to said network destination receivers min-cut, wherein said min-cut is defined as the minimum rate on the link between said network destination receiver and said upstream node.

12. The computer readable storage medium of claim 11 wherein an intermediate node computes a pushback message dependent upon the value of min-cut for said intermediate node and the requests from children nodes of said intermediate node and pushes said pushback message to parent nodes of said intermediate node, said pushback message indicating the layers said parent node should encode together.

13. A computer system comprising:
a memory;
a processor;
a communications interface;
an interconnection mechanism coupling the memory, the processor and the communications interface; and
wherein the memory is encoded with an application utilizing network coding for multi-resolution multicast, that when performed on the processor, provides a process for processing information, the process causing the computer system to perform the operations of:

partitioning, at a network source, source content into a base layer and one or more refinement layers, wherein the base layer provides a lowest resolution associated with the source content and the one or more refinement layers provide a respective one or more resolutions associated with the source content that are at respective higher resolutions than the base layer, wherein the one or more refinement layers are at a respective one or more progressively higher resolutions;

receiving, at said network source, a respective one or more push-back messages from one or more network destination receivers;

computing, at said network source, a network code involving at least one of said base layer and said one or more refinement layers for at least one of said one or more network destination receivers, wherein said network code comprises a random linear network code, said random linear network code comprising random linear combinations of at least a portion of said base layer and zero or more of said refinement layers; and transmitting, by said network source, said network code to said one or more network destination receivers in accordance with said push-back messages.

14. The computer system of claim 13 wherein said computing a network code is done across a plurality of layers.

15. The computer system of claim 13 wherein the pushback messages identify the one or more refinement layers suited for each one of the one or more network destination receivers, respectively.

16. The computer system of claim 13 wherein a pushback message initiated by said network destination receivers is pushed up to said network source allowing upstream nodes to gather information on the demands of any network destination receiver reachable from them.

17. The computer system of claim 16 wherein initially each of said network destination receivers requests for said base layer and said one or more refinement layers to an upstream node at a rate equal to said network destination receivers min-cut, wherein said min-cut is defined as the minimum rate on the link between said network destination receiver and said upstream node.

18. The computer system of claim 17 wherein an intermediate node computes a pushback message dependent upon the value of min-cut for said intermediate node and the requests from children nodes of said intermediate node and pushes said pushback message to parent nodes of said intermediate node, said pushback message indicating the layers said parent node should encode together.

* * * * *